United States Patent

[11] 3,592,075

| [72] | Inventor | Marion A. Clark<br>546 W. Pleasant, Tulare, Calif. 93274 |
|---|---|---|
| [21] | Appl. No. | 871,514 |
| [22] | Filed | Oct. 22, 1969 |
| [45] | Patented | July 13, 1971<br>Continuation-in-part of application Ser. No. 817,030, Apr. 17, 1969, now abandoned. |

[54] STEERING MECHANISM
6 Claims, 10 Drawing Figs.

[52] U.S. Cl. .................................................. 74/498,
74/409, 74/424.8 A
[51] Int. Cl. ...................................................... B62d 1/20
[50] Field of Search............................................ 74/498,
499, 500, 496, 422, 409, 424.8 A

[56] References Cited
UNITED STATES PATENTS

| 968,303 | 8/1910 | Winkler........................ | 74/499 |
| 999,823 | 8/1911 | Mayhew....................... | 74/499 X |
| 1,123,483 | 1/1915 | Carrico ........................ | 74/499 |
| 3,094,011 | 6/1963 | Bradley........................ | 74/424.8 |
| 3,393,577 | 7/1968 | Better........................... | 74/424.8 |

*Primary Examiner*—Milton Kaufman
*Attorneys*—Carl R. Brown and Neil F. Martin

ABSTRACT: This disclosure concerns an improved steering mechanism which eliminates the reverse direction lag which causes play in the steering wheel. The steering wheel is connected to a shaft which has a helical thread at its lower end disposed in the bores of two bearing nuts which are separately movable on the shaft and contain reciprocal threads. In a first embodiment, one of the bearing nuts is formed integral with a single-track rack gear and the other with a double track rack gear with a slot between its tracks which slidably receives the single-track gear. The single-track rack gear is engaged with a single-pinion gear, and the double track rack gear with a pair of pinion gears mounted in axial alignment with and on each side of the single pinion. The pinion gears are mounted on a power shaft which drives the steering rod, and the two paired gears are keyed to the power shaft while the single gear is freely mounted on the power shaft but is connected to the paired pinions by a spring coupling which urges the paired pinion gears in an opposite rotational direction with respect to the single pinion, and in turn, through the rack gears, urges the bearing nuts in opposite linear directions on the helical threads on the steering shaft. In the second embodiment the rack gears and pinion gears are eliminated and a helical spring coupling surrounds the steering shaft between the bearing nuts urging the bearing nuts in opposite linear directions on the helical threads. Also, the power shaft is replaced by a thrust rod which is disposed coaxially with the steering shaft at its lower end and attached to the lower bearing nut. The spring coupling in each embodiment assures that both of the bearing nuts will be in snug engagement at all times with the helical threads on the steering shaft, one with one side of the threads and the other with the opposite side of the threads. Helical ball bearings are provided in each of the ball nuts to reduce the friction between the engaging surfaces of the threads.

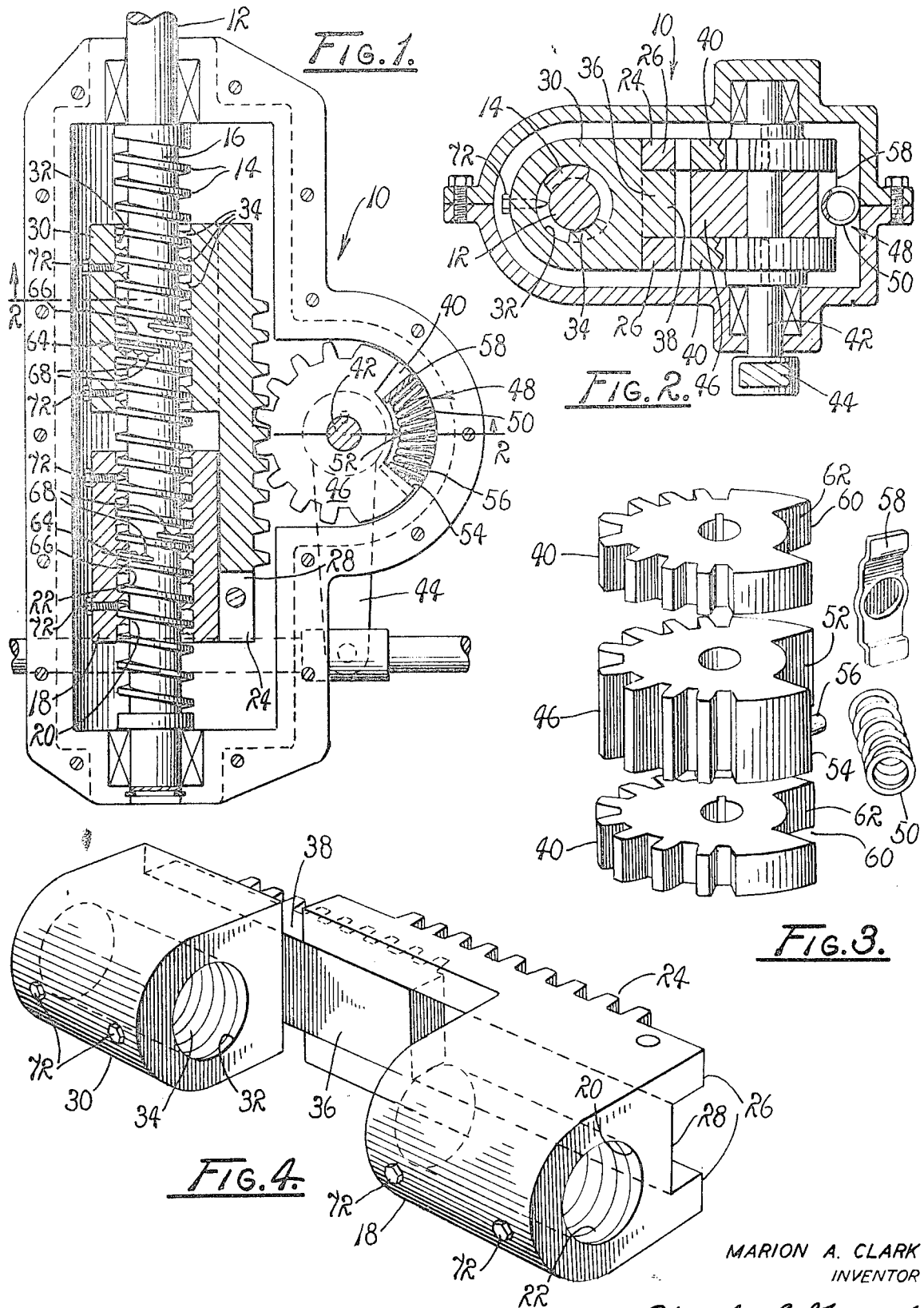

MARION A. CLARK
INVENTOR

PATENTED JUL 13 1971
3,592,075
SHEET 3 OF 3
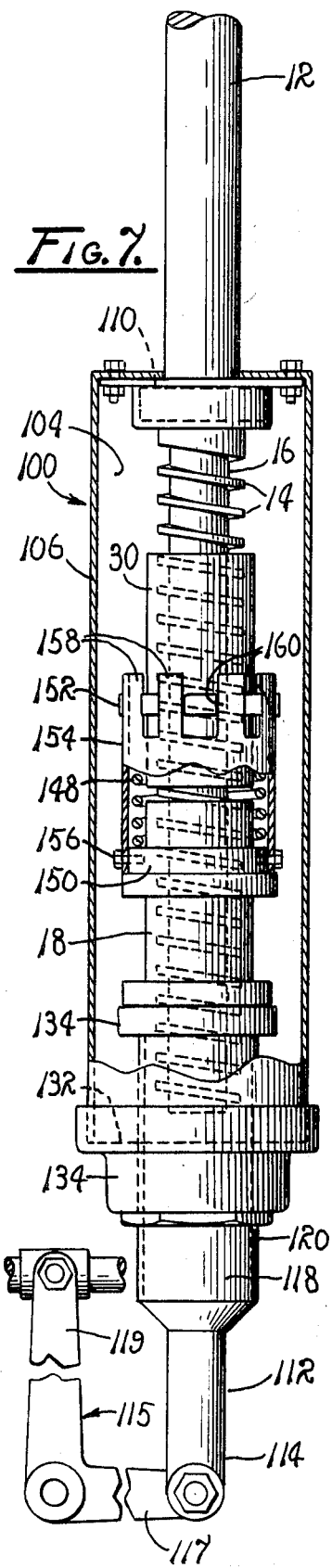
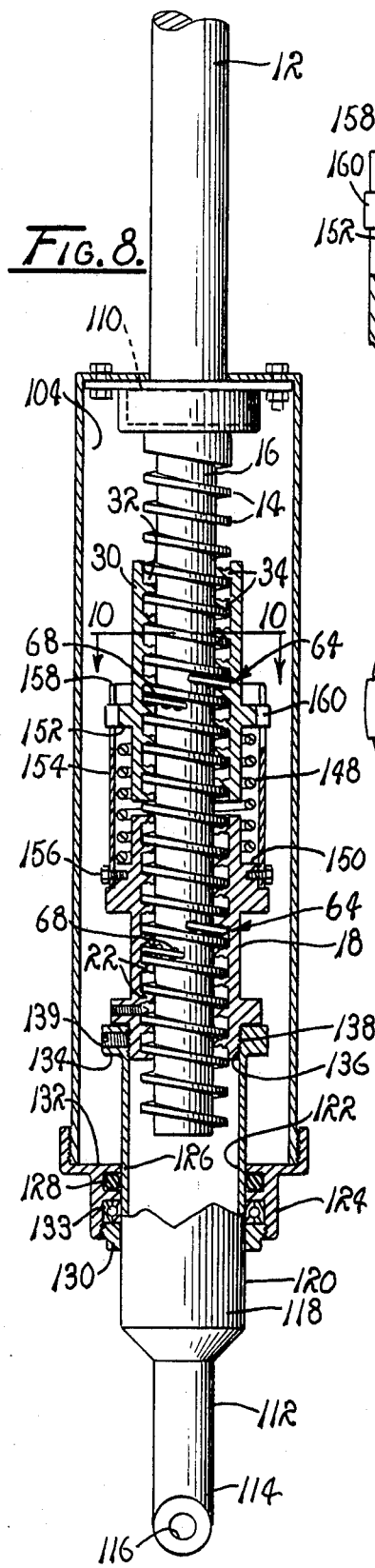
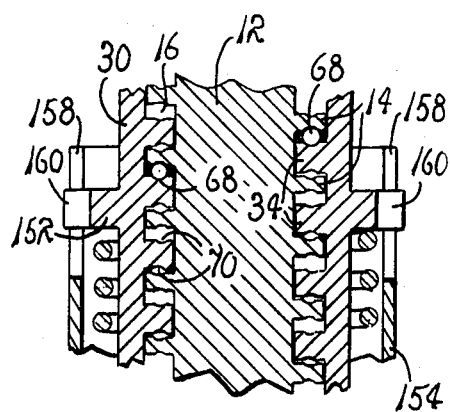
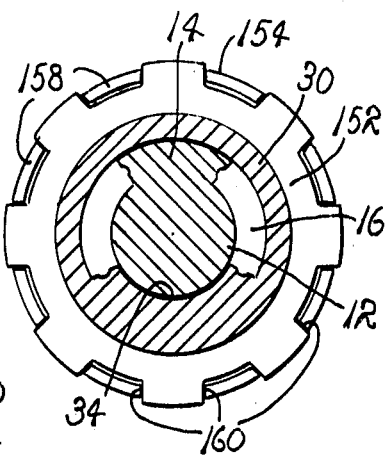
MARION A. CLARK
INVENTOR
Virgil L. Gerard
ATTORNEYS 3,592,075

1

STEERING MECHANISM

This application is a continuation-in-part of application Ser. No. 817,030, filed Apr. 17, 1969 now abandoned, and entitled Steering Mechanism.

BACKGROUND OF THE INVENTION

This invention relates generally to vehicle steering mechanisms and more particularly to improved steering mechanisms with reverse-direction lag reducing features.

With the development of mass produced vehicles, including heavy duty vehicles such as truck, tractors and other self-propelled agricultural and construction vehicles, the elimination of reverse-direction steering lag has been a continuing problem. Steering systems for automobiles, particularly those hydraulically powered, have been developed to greatly reduce the steering wheel play caused by reverse-direction lag, however, these systems, as well as those in use in heavy duty vehicles of the type mentioned above, are not designed to effectively take up the play in the steering mechanism which occurs both from wear in the mechanism and from the need to provide sufficient tolerances to accommodate dirt and other foreign matter, and as a result, substantial reverse-direction steering lag and the resultant steering wheel play, continues to be a problem.

It is, therefore, a major object of my invention to provide an improved steering mechanism which substantially eliminates the steering wheel play caused by reverse-direction lag.

It is another object of my invention to provide an improved mechanism of the type described which is suitable for use on heavy duty equipment such as trucks, earth movers and agricultural equipment, as well as on automobiles.

It is a further object of my invention to provide an improved steering mechanism of the type described which is relatively simple to manufacture and maintain.

It is still another object of my invention to provide a steering mechanism of the type described which delivers an axial thrust output and is therefore more compact, and less complex.

These and other objects and advantages of my invention will become more apparent from the following detailed description of a preferred embodiment and the accompanying drawings in which:

FIG. 1 is a sectional plan view of a first preferred embodiment of my invention;

FIG. 2 is a cross-sectional view taken on lines 2–2 in FIG. 1;

FIG. 3 is an exploded, perspective view of the pinion gears in the first preferred embodiment shown in FIG. 1;

FIG. 4 is a perspective view of the bearing nuts in the first preferred embodiment shown in FIG. 1;

FIG. 7 is a sectional plan view of a second preferred embodiment of my invention;

FIG. 8 is a sectional view similar to FIG. 7 but with the internal parts also shown in section;

FIG. 9 is an enlarged partial sectional view showing the relationship between the bearing nuts on the steering shaft; and FIG. 10 is a cross-sectional view taken on line 10–10 in FIG. 8.

Figures 5, 6:
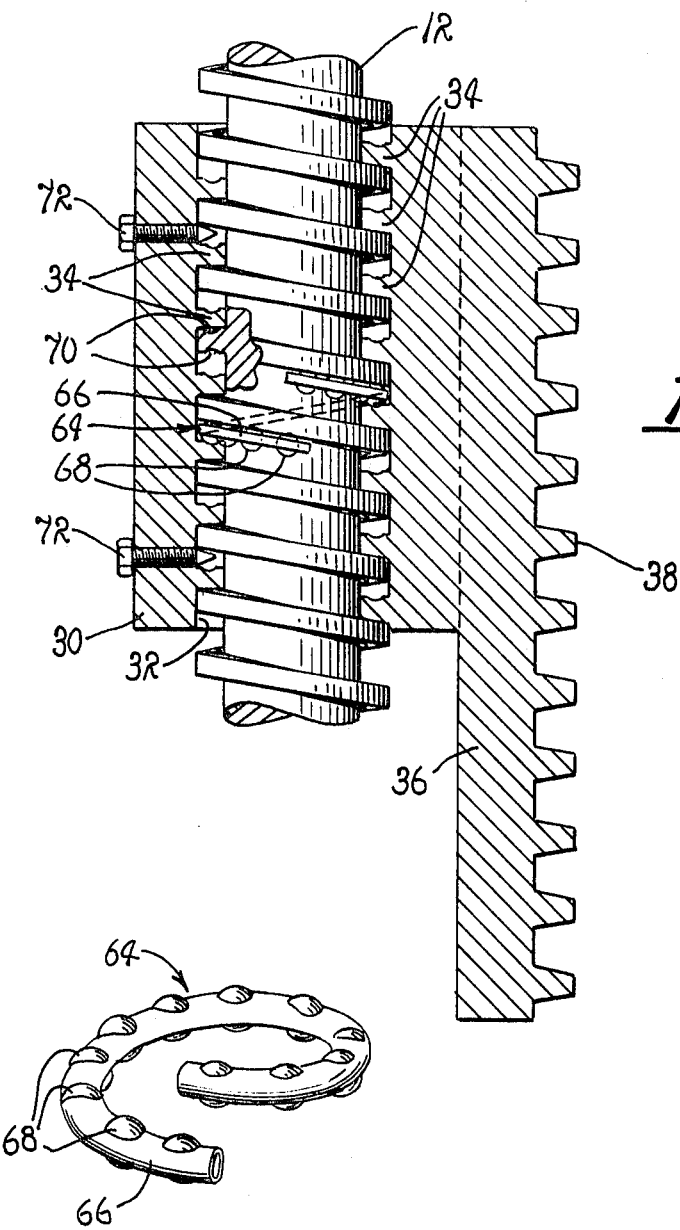
FIG. 5 is a partial sectional view showing the ball-type thrust bearing which is utilized between helical threads of the steering shaft and the internal threads of the bearing nuts in the first preferred embodiment shown in FIG. 1.
FIG. 6 is a perspective view showing the helical ball frame of the thread bearing shown in FIG. 5.

Referring now to the drawings and particularly to 1 through 4 thereof, the numeral 10 designates generally a first preferred embodiment of my improved steering mechanism. The steering mechanism 10 has a steering shaft 12 with helical threads 14 on its lower end 16. A lower bearing nut 18 is provided with a bore 20 through which the lower end 16 of the steering shaft 12 passes and which has internal helical threads 22 that engage the helical threads 14 on the steering shaft. The lower bearing nut 18 has a rack gear 24 integral with it and formed

2 of two parallel gear tracks 26 disposed in spaced relationship to provide a slot 28 therebetween. The gear tracks 26 are aligned with the axis of the steering shaft 12.

Somewhat upward from the lower bearing nut 18 on the lower end 16 of the steering shaft 12, an upper bearing nut 30 is provided with a bore 32 parallel axially to the bore 20 in the lower bearing nut 18 and having internal helical threads 34 which threadedly engage the helical threads 14 on the lower end 16 of the steering shaft. The upper bearing nut 30 has a rack gear 36 integral therewith which forms a gear track 38. When the two bearing nuts are thus assembled on the steering shaft 12 the gear track 38 is disposed in axial alignment with the steering shaft axis and between the parallel gear tracks 26 of the lower bearing nut rack gear 24 in the slot 28. The gear track 38 of the upper bearing nut rack gear is movable telescopically with respect to the two lower parallel gear tracks in the slot 28 when the lower bearing nut 18 and upper bearing nut 30 change their spacing relationship on the steering shaft 12 (see FIG. 4).

A pair of pinion gears 40 are fixedly mounted on a tie rod drive shaft 42 with their teeth engaged with the teeth of the parallel gear tracks 26 on the lower rack gear 24. The tie rod drive shaft 42 has its axis positioned normal to the axis of the parallel gear tracks and has a crank arm 44 affixed at the end below the fixed pinion gears 40. The fixed pinion gears are spaced apart a distance approximately equal to the width of the slot 28 and a floating pinion gear 46 is free mounted on the tie rod drive shaft 42 between the fixed pinion gears 40. The floating pinion gear 46 has its teeth engaged with the teeth of the gear track 38 on the upper rack gear 36 which is disposed in the slot. The floating pinion gear 46 is coupled to the pair of fixed pinion gears 40 by a resilient coupling 48. The resilient coupling 48 consists of a compression spring 50 which is disposed in an opening 52 in the face 54 of the floating pinion gear 46. The cap 58 extends axially beyond each surface of the face of the pinion gear 46 into recesses 60 in the faces 62 of the fixed pinion gears. The pinion gears are assembled on drive shaft 42 and engaged with the rack gears on the ball nuts in such a manner that the recesses 60 in the fixed pinion gears 40 are rotationally offset from the opening 52 in the floating pinion gear 46. With the pinion gears in this relationship, the portions of the cap 58 which project into the recesses 60 are engaged by the adjacent walls of the recesses and urged toward the pin 56 resiliently compressing the spring 50. With the spring 50 thus compressed between one wall of the opening 52 and the oppositely disposed walls of the recesses 60, the floating pinion gears 46 and the fixed pinion gears 40 are resiliently urged in opposite rotational directions on the drive shaft 42. The resilient urging of the spring 50 on the floating pinion gear 46 and the fixed pinion gears 40 is transmitted, respectively, to the upper bearing nut 30 through the upper rack gear 36 and to the lower bearing nut 18 through the lower rack gear 24 and holds the upper bearing nut and lower bearing nut axially apart on the steering shaft 12. The fixed pinion gears 40 and the floating pinion gear 46, upon assembly, are rotationally offset a sufficient amount to compress the compression spring 50 near its compression limits. Therefore, even when the driving power to the vehicle wheels is delivered from the steering shaft 12 to the tie rod drive shaft 42 through the upper ball nut 30 and floating pinion 46, no further compression of spring 50 occurs unless the vehicle wheels provide resistance substantially greater than normal, and even then, the movement is substantially limited.

As wear increases in the threads from extensive use, the compression spring 50 will extend somewhat, however, its extension is limited by a stop pin in the slot 28 (see FIGS. 1 and 4) so that the spring is always in substantial compression. As a result, only wear or the occurrence of excessive resistance in the operation of the mechanism cause any movement in the resilient coupling 48 between the fixed pinion gears 40 and the floating pinion gear 46.

To accommodate the driving rotation between the helical threads 14 on the lower end 16 of the steering shaft 12 and the internal helical threads 22 and 34 in the bore 20 of the lower bearing nut 18 and bore 32 of the upper bearing nut 30 without undue friction, I have provided helical ball bearings 64. The helical ball bearing 64, one one of which is positioned in each of the bearing nuts and the external threads on the lower end of the steering shaft 12, each have a helical ball frame 66. The ball frame 66 houses a quantity of bearing balls 68 in a manner which maintains their spacing but permits them to rotate freely in all directions. The bearing balls 68 are contained in the space between the internal bearing nut threads and the external steering shaft threads by bearing guide grooves 70 in the thrust surfaces of each of these threads.

Since in my invention, the thrust surfaces on the threads are not circumferential surfaces, as in many mechanisms in the prior art, but are surfaces generally normal to the axis of the steering shaft 12, the force on the bearing balls 68, captured between the surfaces, being generally axial with respect to the steering shaft, is essentially one of compression and shearing forces on the bearing balls are avoided.

To position the ball frames 66 within the bearing nuts upon assembly with the steering shaft, stop screws 72 are threaded through the bearing nut housing and project radially into the bores 20 and 32 at each end, a distance sufficient to extend between the internal threads of the bearing nut and the external threads of the steering shaft and into the helical path of the ball frame. Therefore, if the ball frame 66 in either of the bearing nuts 18 and 30 travels to one end of the bore during assembly, it is prevented from passing out of the bore by one of the stop screws 72. After assembly the stop screws 72 can be removed, if desired, since the other movement limitations of the mechanism prevent movement to such an extent that the ball frames 66 could be carried out of the bores.

In operation, the first embodiment of my improved steering mechanism performs as follows. When the steering shaft 12 is rotated by the driver in a clockwise direction as viewed from the steering wheel end in FIG. 1, the steering shaft threads 14 engage the internal bore threads 34 of the upper bearing nut 30 and drive the upper bearing nut downward with respect to the steering shaft. The downward movement of the upper bearing nut 30 carries with it the upper rack 36 and the single-gear track 38 mounted thereon. As the gear track 38 moves downwardly it engages the peripheral teeth of the floating pinion gear 46 and rotates the floating pinion gear in a counterclockwise direction (looking down on plan view FIG. 1), and in turn, through the resilient coupling 48 and fixed pinion gears 40, rotates the tie rod drive shaft 42 and crank arm 44, which turns the vehicle to the right.

The clockwise rotation of the steering shaft 12 also moves the threads 14 which are inside the lower bearing nut bore 20 downward toward engagement with the upwardly directed surface of the bore threads 22. However, due to the compressed condition of the compression spring 50 between the floating pinion 46 and fixed pinions 40, as the upper bearing nut 30 moves downwardly and rotates the floating pinion 46 counterclockwise through the upper rack gear 36, the lower bearing nut 18 is driven downwardly by the resilient urging of the compression spring 50 acting through the fixed pinions 40 and the lower rack gear 24, so that the downwardly directed surfaces on the threads 14 never drivingly engage the upwardly directed surfaces of the internal bore threads 22. No bearing is, therefore, required between these thread surfaces in the lower bearing nut. In addition, this same resilient urging of the compression spring 50 which drives the lower bearing nut 18 downwardly, also holds the downwardly directed surfaces on the internal bore threads 22 in engagement with the upwardly directed surfaces on the steering shaft threads 14 with the bearing balls 64 captured in between.

When the steering shaft 12 is then rotated in the opposite direction (i.e., counterclockwise) the threads 14 move to drive the bearing nuts upwardly. Since the upwardly directed surfaces on the steering shaft threads 14 in the lower bearing nut 18 are already engaged with the downwardly directed surfaces on the bore threads 22, the lower bearing nut is immediately driven upwardly without thread lag or play, and acting through the lower rack gear 24 and fixed pinion gears 40, rotates the tie rod drive shaft 42 clockwise which through the crank arm 44 turns the vehicle wheels to the left.

In the upper bearing nut 30 the counterclockwise rotation of the steering shaft 12 and the resulting upward movement of the threads 14 tends to carry the upwardly directed surfaces of these threads toward engagement with the downwardly directed surfaces on the bore threads 34. Driving engagement between these thread surfaces is prevented, however, by the resilient urging of the compression spring 50 which by reason of its compressed condition between the fixed pinions 40 and the floating pinion 46 now acts through the floating pinion and upper rack gear to resiliently urge the upper bearing nut 30 upwardly. No bearing is, therefore, required between these thread surfaces in the upper bearing nut. In addition, this same resilient urging now holds the upwardly directed surfaces on bore threads 34 in engagement with the downwardly directed surfaces on the steering shaft threads 14 with the bearing balls 64 captured in between.

It will thus be understood that in either direction of rotation of the steering shaft 12, the internal bore threads of one of the bearing nuts is always positioned for immediate driving engagement by the steering shaft threads 14 without any lag. Referring now to FIGS. 7 through 10, I will describe a second preferred embodiment of my invention, designated generally by the numeral 100. Since numerous parts of the second embodiment of my steering mechanism are the same as in the first embodiment, I will use the same reference numerals for these parts.

The steering mechanism 100 is mounted on the lower end 16 of steering shaft 12 in a lubricant filled chamber 104 formed about the lower end 16 by a housing 106. The housing 106 surrounds the steering shaft lower end 16 and includes a seal and two-way thrust bearing 110 at its upper end which prevents leakage of lubricant between the housing and the steering shaft 12. The housing 106 is also sealed at its lower end as will be described later.

In this second embodiment, a thrust rod 112 is mounted on the lower bearing nut 18 coaxially with the steering shaft 12 and extends downward externally of the housing 106. The thrust rod 112 has a connecting portion 114 at its lower end which is connectable to the tie rod by means of a bolt hole 116 and appropriate linkage (see FIG. 7). At its upper end, the thrust rod 112 has an enlarged portion 118 which has a cylindrical outer surface 120 and a cylindrical bore 122. The thrust rod 112 is supported in the lower end of the housing 106 by a cap 124 which threads on the housing and has a cylindrical passage 126 that surrounds the enlarged portion 118 of the thrust rod. The enlarged portion 118 of the thrust rod is movable axially with respect to the cap 124 through the passage 126 and an O-ring seal 128 and packing gland 130 are provided to form a seal between the cap 124 and the outer surface 120 of the thrust rod. Also, an inwardly directed radial flange 132 is provided on the cap 124 adjacent the passage 126 which is engageable by an outwardly directed annular shoulder 134 on the uppermost portion of the thrust rod 112 to prevent the thrust rod from traveling downwardly out of the housing 106, and a radial thrust bearing 133 is provided to accommodate radially directed forces on the thrust rod.

The thrust rod bore 122 has internal threads 136 which engage external threads 138 on the lower bearing nut 18 and connect the thrust rod to the bearing nut, and a lock screw 139 is provided to prevent inadvertent disengagement of this connection.

To resiliently urge the upper bearing nut 30 and lower bearing nut 18 apart axially on the steering shaft 12 and maintain the upwardly directed surfaces of the upper bearing nut threads 34 in continuous engagement with the downwardly directed surfaces of steering shaft threads 14, and the downwardly directed surfaces of the lower bearing nut threads 22 in continuous engagement with the upwardly directed surfaces of steering shaft threads 14, as in my first embodiment, a helical spring 148 is positioned between the bearing nuts coaxially surrounding the steering shaft 12. The spring 148 is captured in a compressed condition between a lower nut spring shoulder 150 which projects radially from the lower bearing nut 18 and an upper nut spring shoulder 152 which projects radially from the upper bearing nut 30. As in my first embodiment, the spring 148 is compressed to a position near its compression limits upon assembly so very little movement between the upper bearings nut 30 and lower bearing nut 18 is possible, but the bearing nuts are under constant resilient urging to separate axially.

Rotational movement between the bearing nuts is further restricted by a positive mechanical coupling formed by a connecting sleeve 154. The connecting sleeve 154 is mounted on the lower bearing nut 18 and positioned coaxially with respect to the steering shaft 12. The connecting sleeve 154 overlies the lower nut spring shoulder 150 which it is secured by bolts 156, and extends upwardly therefrom into overlying relationship with the upper nut spring shoulder 152. The upper end of the connecting sleeve 154 has axially projecting fingers 158 which pass through slots 160 in the periphery of the upper nut spring shoulder 152. The slots 160 are substantially the same width as the fingers 158 and permit slight axial movement between the connecting sleeve 154 and the upper bearing nut 30, but are not so wide as to permit rotational movement (see FIGS. 9 and 10).

My second embodiment operates as follows: When the steering shaft 12 is rotated by the driver in a clockwise direction as viewed from the steering wheel end in FIG. 7, the steering shaft threads 14 engage the internal bore threads 34 of the upper bearing 30 and drive the upper bearing nut downward with respect to the steering shaft. The downward movement of the upper bearing nut 30 carries with it the upper nut spring shoulder 152 which, being in engagement with the compressed spring 148, drives the lower bearing nut 18 axially downward by reason of the pressure exerted by the spring 148 on the lower nut spring shoulder 150. Since the thrust rod 112 is connected to the lower bearing nut 18, it moves downward with the lower bearing nut causing the enlarged portion to move downwardly through the passage 126 and the cap 124 and the connecting portion 114 to move the vehicle tie rod through the linkage 115, turning the vehicle to the right. The linkage in this embodiment has a pivoted lever 115 with a short arm 117 connected to the pivot hole 116 in the thrust rod and a long arm 119 connected to the tie rod.

As in the first embodiment of my invention, the clockwise rotation of the steering shaft 12 also moves the threads 14 which are inside the lower bearing nut bore 20 downward toward engagement with the upwardly directed surface of the bore threads 22. However, due to the compressed condition of the spring 148 between the upper bearing nut 30 and the lower bearing nut 18, the lower bearing nut 18 is driven downwardly by the resilient urging of the spring so that the downwardly directed surfaces on the threads 14 never drivingly engage the upwardly directed surfaces on the internal bore threads 22, and no bearing is therefore required between these thread surfaces in the lower bearing nut. In addition, this same resilient urging of the spring 148 holds the downwardly directed surfaces of the internal bore threads 22 in engagement with the upwardly directed surfaces of the steering shaft threads 14 with the bearing balls 64 captured therebetween.

If unusual resistance is encountered during this maneuver the spring 148 will be compressed a slight additional amount permitting slight axial movement between the upper bearing nut 30 and the connecting sleeve 154. The spacing between the juxtaposed surfaces of the upper bearing nut 30 and the lower bearing nut 18 is very slight, however, so that these surfaces of the nuts engage before any engagement occurs between the downwardly directed surfaces on the steering shaft threads 14 and the upwardly directed surfaces on the internal bore threads 22 in lower bearing nut 18. When the steering shaft 12 is then rotated in the opposite direction (i.e., counterclockwise) the threads 14 move to drive the bearing nuts upwardly. Since the upwardly directed surfaces on the steering shaft threads 14 in the lower bearing nut 18 are already engaged with the downwardly directed surface on the bore threads 22, the lower bearing nut is immediately driven upwardly without thread lag or play, and carries the thrust rod upwardly with respect to the housing 106 and cap 124 which through the linkage lever 115 moves the tie rod of the vehicle in the opposite direction and turns the wheels to the left.

In the upper bearing nut 30 the counterclockwise rotation of the steering shaft 12 and the resulting upward movement of the threads 14 tends to carry the upwardly directed surfaces of these threads toward engagement with the downwardly directed surfaces on the bore threads 34. Driving engagement between these thread surfaces is prevented, however, by the resilient urging of the spring 148 which by reason of its compression between the lower bearing nut 18 and the upper bearing nut 30 resiliently urges the upper bearing nut 30 upwardly. Again, no bearing is, therefore, required between these threads surfaces in the upper bearing nut. In addition, this same resilient urging now holds the upwardly directed surfaces of the bore threads in engagement with the downwardly directed surfaces of the steering shaft threads 14 with the bearing ball 64 captured therebetween.

Again, if unusual resistance to the upward movement of the upper bearing nut 30 is encountered during this maneuver, the lower bearing nut moves axially a slight distance toward the upper bearing nut sliding the fingers 158 on the connecting sleeve 154 axially in the slots 160 and further compressing the spring 148 until the lower bearing nut engages the juxtaposed surface of the upper bearing nut and the driving force is transmitted from the lower bearing nut 18 to the upper bearing nut 30 as if the nuts were connected.

It will thus be understood that in either direction of rotation of the steering shaft 12 the internal bore threads of the bearing nuts in my second embodiment are always positioned for immediate driving engagement by the steering shaft threads without any lag, the same as in my first embodiment. It should also be understood that by utilizing an axial thrust output for my steering mechanism 100 of my second embodiment, I have minimized its size and complexity by eliminating the rack gears and pinion gears required in the first embodiment.

I claim:

1. An improved vehicle steering mechanism comprising:
   a steering shaft having one end adapted to be drivingly interconnected with a steering wheel and having external threads formed on the other end thereof;
   first bearing nut means operatively associated with said steering shaft and disposed for driving engagement by said external threads;
   second bearing and means operatively associated with said steering shaft and disposed for driving engagement by said external threads, said second bearing nut means being normally spaced apart from said first bearing nut means axially with respect to said steering shaft;
   bearing means disposed between engageable surfaces of said external threads and said first and second bearing nut means to prevent direct engagement thereof;
   tie rod means drivingly connected to said steering shaft by interconnecting means and having steering connection means for steering a steerable wheel of said vehicle;
   said interconnecting means including first rack and pinion gear means connected to said first bearing nut means, and second rack and pinion gear means connected to said second bearing nut means; and
   resilient means interconnected between first and second gears means to urge said first and second bearing nut means apart axially with respect to said steering shaft, when said steering mechanism is subjected to normal operating forces, and to limit movement of said first and second bearing nut means together axially when said steering mechanism is subjected to greater than normal operating forces.

2. An improved vehicle steering mechanism as described in claim 1, in which:

said tie rod drive means includes a drive shaft operatively associated with said first and second bearing nut means;

said first gear means including a first rack gear connected to said first bearing nut means and disposed axially with respect to said steering shaft, a first pinion gear engaged with said first rack gear and being freely rotatably mounted on said drive shaft, a second rack gear connected to said second bearing nut means and disposed axially with respect to said shaft, a second pinion gear fixed on said drive shaft adjacent said first pinion gear and engaged with said second rack gear, said resilient means comprising a compression spring normally partially compressed between said pinion gears and disposed to urge relative rotational movement of the pinion gears in one direction and to resist relative rotational movement in the opposite direction;

and limit means disposed to limit the relative rotational movement of said pinion gears in said one direction.

3. An improved vehicle steering mechanism comprising:

a steering shaft having one end adapted to be drivingly interconnected with a steering wheel and having external threads formed on the other end thereof;

first bearing nut means operatively associated with said steering shaft and disposed for driving engagement by said external threads;

second bearing nut means operatively associated with said steering shaft and disposed for driving engagement by said external threads, said second bearing nut means being normally spaced apart from said first bearing nut means axially with respect to said steering shaft;

bearing means disposed between engageable surfaces of said external threads and said first and second bearing nut means to prevent direct engagement thereof;

tie rod means drivingly connected to said steering shaft by interconnecting means and having steering connection means for steering a steerable wheel of said vehicle;

said interconnecting means including a helical spring disposed in coaxial surrounding relation with said steering shaft and interposed axially between said first and second bearing nut means in a compressed condition to urge the first and second bearing nut means axially apart, a sleeve disposed in coaxial surrounding relation with said steering shaft, spring, and bearing nut means and connected to one of said bearing nut means, and spline means interconnecting said sleeve with the other of said bearing nut means to limit relative rotational movement of the bearing nut means while permitting axial movement thereof with the respect to said steering shaft.

4. An improved vehicle steering mechanism as described in claim 3, in which:

said tie rod means includes a thrust rod disposed coaxially with respect to said steering shaft and connected to one of said bearing nut means for axial movement therewith, and a housing disposed in coaxial surrounding relation with respect to said steering shaft and supporting said thrust rod for axial movement with respect thereto, said spring, bearing nut means and sleeve being disposed inside said housing.

5. An improved vehicle steering mechanism comprising:

a steering shaft having one end adapted to be drivingly interconnected with a steering wheel and having external threads formed on the other end thereof;

first bearing nut means operatively associated with said steering shaft and disposed for driving engagement by said external threads;

second bearing nut means operatively associated with said steering shaft and disposed for driving engagement by said external threads, said second bearing nut means being normally spaced apart from said first bearing nut means axially with respect to said steering shaft;

bearing means disposed between engageable surfaces of said external threads and said first and second bearing nut means to prevent direct engagement thereof;

tie rod means drivingly connected to said steering shaft by interconnecting means and having steering connection means for steering a steerable wheel of said vehicle;

said first and second bearing nut means each having a bore with internal threads interfitting with said external threads, the internal and external threads having opposed radial surfaces;

said bearing means comprising a plurality of bearing balls disposed in each of said bearing nut means between said opposed radial surfaces, ball grooves in said opposed radial surfaces to form races for said bearing balls, and a helical ball frame in each of said bearing nut means to position said bearing balls in helical spaced relation.

6. An improved vehicle steering mechanism as described in claim 5 in which:

said tie rod drive means includes a thrust rod disposed coaxially with respect to said steering shaft and connected thereto, and a housing disposed in coaxial surrounding relation with respect to said steering shaft and supporting said thrust rod for axial movement with respect thereto;

said interconnecting means including a helical spring disposed in coaxial surrounding relation with said steering shaft and interposed axially between said first and second bearing nut means in a compressed condition to urge the first and second bearing nut means axially apart, a sleeve disposed in coaxial surrounding relation with said steering shaft, spring, and bearing nut means and connected to one of said bearing nut means, and spline means interconnecting said sleeve with the other of said bearing nut means to limit relative rotational movement of the bearing nut means while permitting axial movement thereof with respect to said steering shaft, said spring, bearing nut means and sleeve being disposed inside said housing;

and said interconnecting means being further disposed to limit relative axial movement of said first and second bearing nut means toward one another.